United States Patent
Rodriguez

(10) Patent No.: US 6,808,544 B1
(45) Date of Patent: Oct. 26, 2004

(54) FURNACE EXHAUST FILTER ASSEMBLY

(76) Inventor: Angel L. Rodriguez, 1720 W. Carroll St. #17, Kissimmee, FL (US) 34741

( * ) Notice: Subject to any disclaimer, the term of this patent is extended or adjusted under 35 U.S.C. 154(b) by 27 days.

(21) Appl. No.: 10/352,395

(22) Filed: Jan. 29, 2003

(51) Int. Cl.$^7$ .............................................. B01D 50/00
(52) U.S. Cl. ............... 55/385.1; 55/385.4; 55/DIG. 35; 96/223; 96/226; 96/227
(58) Field of Search ............................ 55/385.1, 385.4, 55/385.3, 341, 501, DIG. 30, DIG. 35, DIG. 28; 96/223, 226, 227; 210/232; 123/198 E

(56) References Cited

U.S. PATENT DOCUMENTS

| | | | | |
|---|---|---|---|---|
| 3,675,398 A | * | 7/1972 | Giarrizzo | 55/DIG. 30 |
| 3,796,024 A | | 3/1974 | Mier | |
| 4,371,385 A | * | 2/1983 | Johnson | 55/DIG. 30 |
| 4,503,672 A | * | 3/1985 | Stark et al. | 55/DIG. 30 |
| 4,541,240 A | * | 9/1985 | Munro | 55/DIG. 30 |
| 4,670,223 A | * | 6/1987 | Delachapelle | 55/DIG. 30 |
| 4,913,712 A | * | 4/1990 | Gabathuler et al. | 55/DIG. 30 |
| 5,104,627 A | * | 4/1992 | Usui et al. | 55/DIG. 30 |
| 5,318,755 A | | 6/1994 | Kuivalainen et al. | |
| 5,404,801 A | | 4/1995 | Holland | |
| 5,453,108 A | | 9/1995 | Isaksson et al. | |
| D366,516 S | | 1/1996 | Stewart | |
| 5,681,461 A | * | 10/1997 | Gullett et al. | 210/232 |
| 5,738,706 A | | 4/1998 | Swanander et al. | |
| 6,112,519 A | * | 9/2000 | Shimasaki et al. | 55/DIG. 30 |
| 6,185,934 B1 | * | 2/2001 | Teboul | 55/DIG. 30 |
| 6,464,744 B2 | * | 10/2002 | Cutler et al. | 55/DIG. 30 |

* cited by examiner

*Primary Examiner*—Blaine Copenheaver
*Assistant Examiner*—Minh-Chau T. Pham

(57) ABSTRACT

A furnace exhaust filter assembly for removing harmful particles being expelled through an exhaust pipe of a furnace. The furnace exhaust filter assembly includes a tubular member having a side wall and open top and bottom ends; and also includes filter members being attached to the tubular member for filtering exhaust from a furnace; and further includes filtering materials being attached to the filter members for filtering the exhaust from the furnace.

6 Claims, 3 Drawing Sheets

FURNACE EXHAUST FILTER ASSEMBLY

BACKGROUND OF THE INVENTION

1. Field of the Invention

The present invention relates to furnace exhaust filters and more particularly pertains to a new furnace exhaust filter assembly for removing harmful particles being expelled through an exhaust pipe of a furnace.

2. Description of the Prior Art

The use of furnace exhaust filters is known in the prior art. More specifically, furnace exhaust filters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,318,755; 3,796,024; 5,453,108; 5,738,706; 5,404,801; and U.S. Pat. No. Des. 366,516.

While these devices fulfill their respective, particular objectives and requirements, the aforementioned patents do not disclose a new furnace exhaust filter assembly. The prior art includes pipes and screens contained in the pipes for filtering the air as it passes therethrough.

SUMMARY OF THE INVENTION

The general purpose of the present invention, which will be described subsequently in greater detail, is to provide a new furnace exhaust filter assembly which has many of the advantages of the furnace exhaust filters mentioned heretofore and many novel features that result in a new furnace exhaust filter assembly which is not anticipated, rendered obvious, suggested, or even implied by any of the prior art furnace exhaust filters, either alone or in any combination thereof. The present invention includes a tubular member having a side wall and open top and bottom ends; and also includes filter members being attached to the tubular member for filtering exhaust from a furnace; and further includes filtering materials being attached to the filter members for filtering the exhaust from the furnace. None of the prior art includes the combination of the elements of the present invention.

There has thus been outlined, rather broadly, the more important features of the furnace exhaust filter assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new furnace exhaust filter assembly which has many of the advantages of the furnace exhaust filters mentioned heretofore and many novel features that result in a new furnace exhaust filter assembly which is not anticipated, rendered obvious, suggested, or even implied by any of the prior art furnace exhaust filters, either alone or in any combination thereof.

Still another object of the present invention is to provide a new furnace exhaust filter assembly for removing harmful particles being expelled through an exhaust pipe of a furnace.

Still yet another object of the present invention is to provide a new furnace exhaust filter assembly that is easy and convenient to attach to an existing exhaust pipe of a furnace.

Even still another object of the present invention is to provide a new furnace exhaust filter assembly that not only eliminates harmful pollution from being expelled into the air but also freshens the air.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
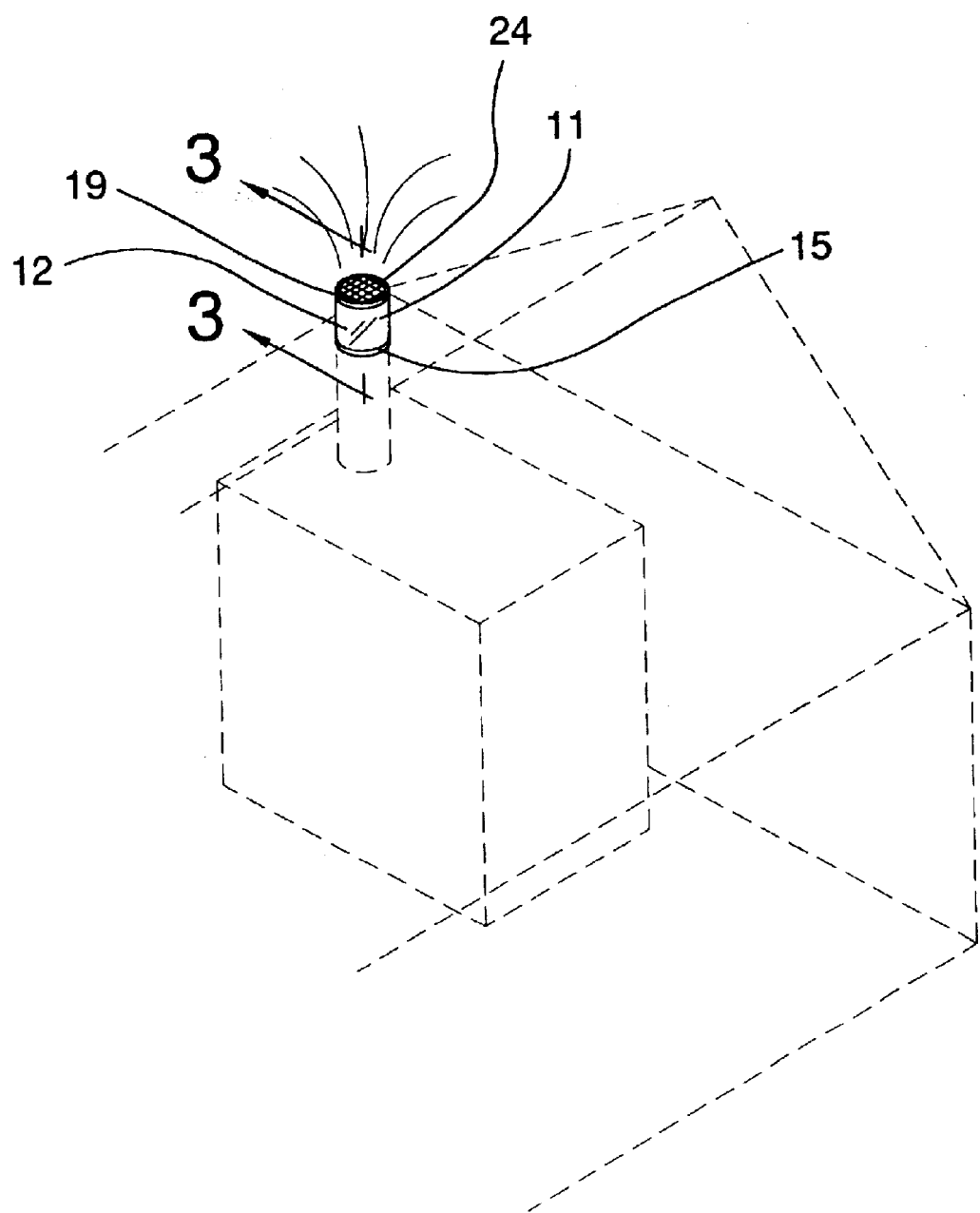
FIG. 1 is a perspective view of a new furnace exhaust filter assembly according to the present invention and shown in use.
Figure 2:
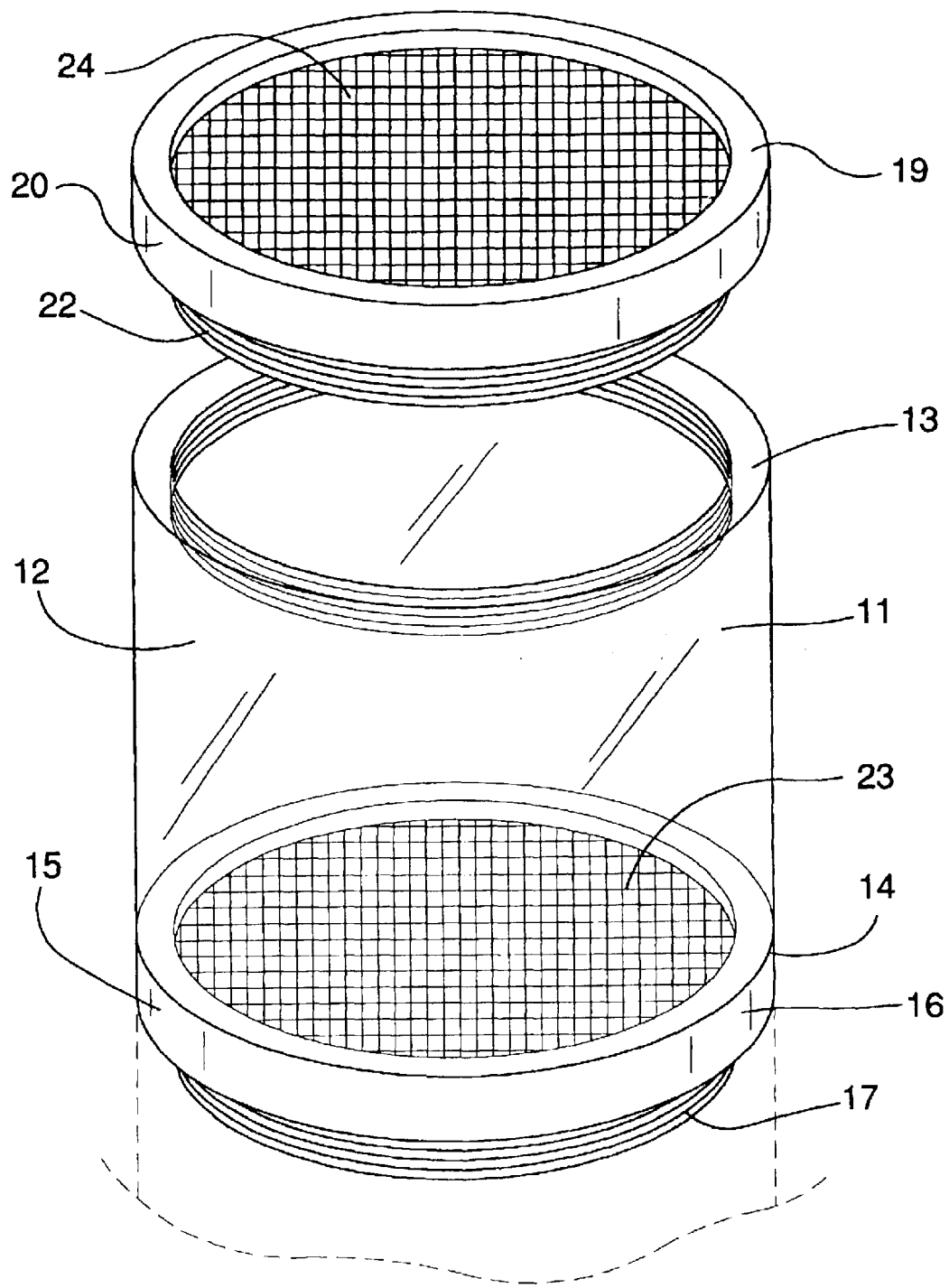
FIG. 2 is an exploded perspective view of the present invention.
Figure 3:
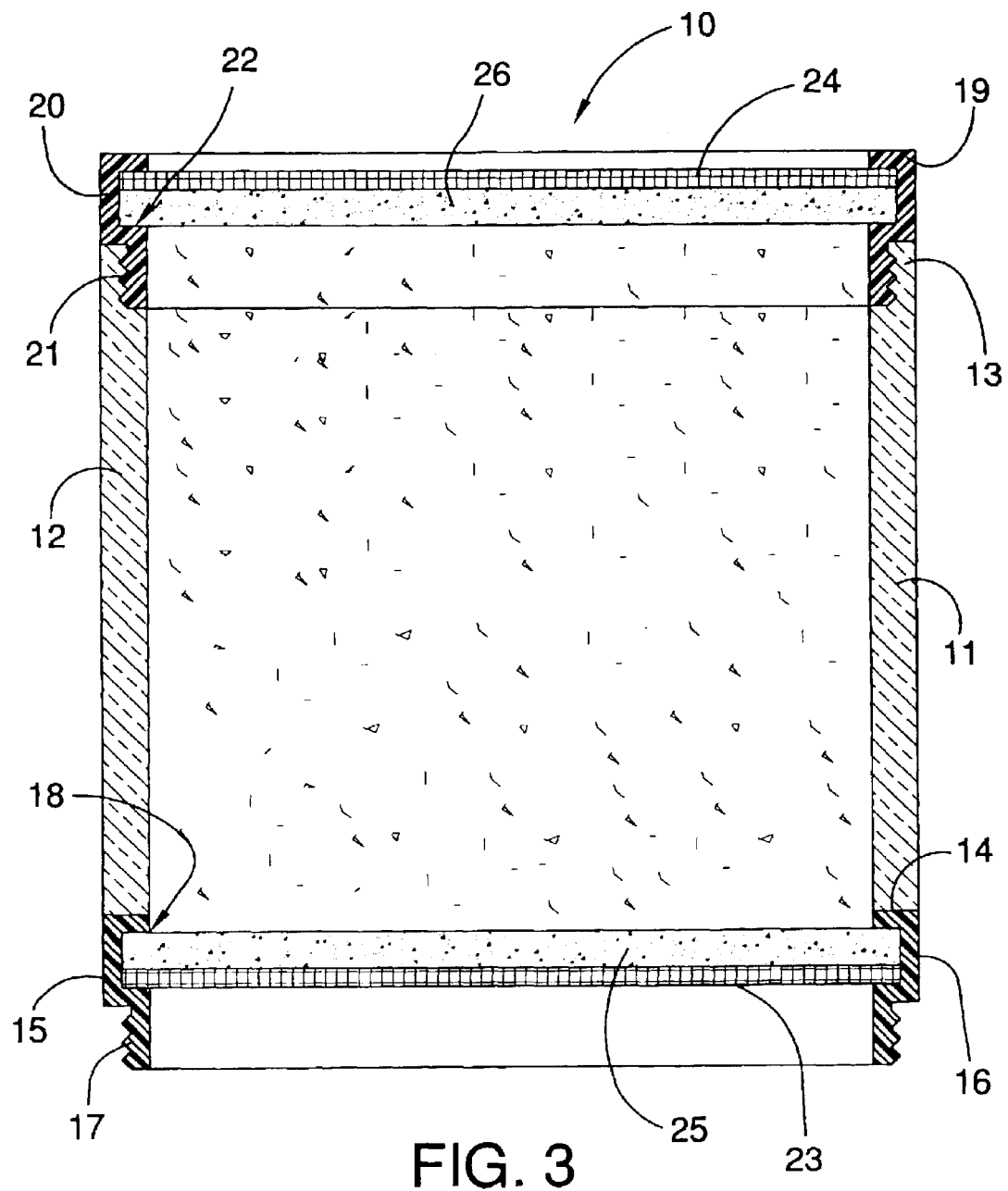
FIG. 3 is a cross-sectional view of the present invention.

With reference now to the drawings, and in particular to FIGS. 1 through 3 thereof, a new furnace exhaust filter assembly embodying the principles and concepts of the present invention and generally designated by the reference numeral 10 will be described.

As best illustrated in FIGS. 1 through 3, the furnace exhaust filter assembly 10 generally comprises a tubular member 11 having a side wall 12 and open top and bottom ends 13,14. Filter members are conventionally attached to the tubular member 11 for filtering exhaust from a furnace. The filter members includes a first filter member having a first support ring 15 which is securely and conventionally attached to the open bottom end 14 of the tubular member 11 and which includes a main portion 16 and an annular recessed rim portion 17 integrally extending outwardly from the main portion 16, and also having a first screen member 23 being conventionally disposed within the first support ring 15. The annular recessed rim portion 17 is externally threaded for threading into a top end of an exhaust pipe for the furnace. The main portion 16 of the first support ring 15 has an annular groove 18 being disposed in an inner side thereof. The first screen member 23 has a perimeter edge being securely and conventionally disposed in the annular groove 18. The filter members also includes a second filter member having a second support ring 18 being removably and conventionally attached at the open top end 13 of the tubular member 11 and having a main portion 20 and an annular recessed rim portion 21 integrally extending outwardly from the main portion 20, and also having a second screen member 24 being conventionally disposed within the second support ring 19. The annular recessed rim portion 21 is externally threaded for threading into the top end 13 of the tubular member 11. The main portion 20 of the second support ring 19 has an annular groove 22 being disposed in an inner side thereof. The second screen member 24 has a perimeter edge being securely and conventionally disposed in the annular groove 22 of the second support ring 19.

Filtering materials 25,26 are conventionally attached to the filter members for further filtering the exhaust from the furnace. The filtering materials 25,26 include first and second biscuits each comprising bleach substances and chlorine substances with the first biscuit having an outer perimeter which is securely and conventionally disposed in the annular groove 18 of the first support ring 15 and through which the exhaust from the furnace passes, and with the second biscuit having an outer perimeter which is securely and conventionally disposed in the annular groove 22 of the second support ring 19 and through which the exhaust from the furnace passes. Each of the first and second biscuits includes bleach in an amount of at least 50 percent by weight, and also includes chlorine in an amount of at least 50 percent by weight.

In use, the exhaust from the furnace passes through the exhaust pipe and passes through the first and second screen members 23,24 and through the first and second biscuits 25,26; whereupon, the harmful polluted exhaust is extracted from the exhaust by the first and second screen members 23,24, and by the bleach and the chlorine contained in the first and second biscuits 25,26 with a much cleaner air being expelled from the tubular member 11. The user can easily remove and replace the first and second biscuits 15,16 and can also clean the first and second screen members 25,26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the furnace exhaust filter assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A furnace exhaust filter assembly comprising:

a tubular member having a side wall and open top and bottom ends;

filter members being attached to said tubular member for filtering exhaust from a furnace, said filter members including a first filter member having a first support ring which is securely attached to said open bottom end of said tubular member and which includes a main portion and an annular recessed rim portion extending outwardly from said main portion, and also having a first screen member being disposed within said first support ring, said annular recessed rim portion being externally threaded for threading into a top end of an exhaust pipe for the furnace; and filtering materials being attached to said filter members for filtering the exhaust from the furnace.

2. The furnace exhaust filter assembly as described in claim 1, wherein said main portion of said first support ring has an annular groove being disposed in an inner side thereof, said first screen member having a perimeter edge being securely disposed in said annular groove.

3. The furnace exhaust filter assembly as described in claim 2, wherein said filter members also includes a second filter member having a second support ring being removably attached at said open top end of said tubular member and having a main portion and an annular recessed rim portion extending outwardly from said main portion, and also having a second screen member being disposed within said second support ring, said annular recessed rim portion being externally threaded for threading into said top end of said tubular member.

4. The furnace exhaust filter assembly as described in claim 3, wherein said main portion of said second support ring has an annular groove being disposed in an inner side thereof, said second screen member having a perimeter edge being securely disposed in said annular groove of said second support ring.

5. The furnace exhaust filter assembly as described in claim 4, wherein said filtering materials include first and second biscuits each comprising bleach substances and chlorine substances, said first biscuit having an outer perimeter which is securely disposed in said annular groove of said first support ring and through which the exhaust from the furnace passes, said second biscuit having an outer perimeter which is securely disposed in said annular groove of said second support ring and through which the exhaust from the furnace passes.

6. The furnace exhaust filter assembly as described in claim 5, wherein each of said first and second biscuits includes said bleach in an amount of at least 50 percent by weight, and also includes said chlorine in an amount of at least 50 percent by weight.

* * * * *